(12) United States Patent
Piemonte

(10) Patent No.: US 8,907,943 B2
(45) Date of Patent: Dec. 9, 2014

(54) SENSOR BASED DISPLAY ENVIRONMENT

(75) Inventor: Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 840 days.

(21) Appl. No.: 12/831,722

(22) Filed: Jul. 7, 2010

(65) Prior Publication Data

US 2012/0007850 A1    Jan. 12, 2012

(51) Int. Cl.
*G06T 15/00* (2011.01)
*G06F 3/048* (2013.01)
*G06F 3/0346* (2013.01)
*G06F 3/0481* (2013.01)

(52) U.S. Cl.
CPC .......... *G06F 3/0346* (2013.01); *G06F 3/04815* (2013.01)
USPC ........... 345/419; 715/848; 715/849; 715/850; 715/851; 715/852

(58) Field of Classification Search
CPC ..... G06T 7/004; G06T 19/00; G06T 2210/04; G06F 3/011; G06F 17/5004; G06F 3/04815; G06F 17/30873; G06K 9/00664
USPC .......................................................... 345/419
See application file for complete search history.

(56) References Cited

U.S. PATENT DOCUMENTS

| | | | |
|---|---|---|---|
| 7,013,435 B2 * | 3/2006 | Gallo et al. | 715/850 |
| 7,184,025 B2 | 2/2007 | Williams et al. | |
| 7,737,965 B2 * | 6/2010 | Alter et al. | 345/419 |
| 2009/0066637 A1 * | 3/2009 | McCall | 345/156 |
| 2009/0303231 A1 | 12/2009 | Robinet et al. | |
| 2010/0045666 A1 | 2/2010 | Kornmann et al. | |
| 2010/0053219 A1 * | 3/2010 | Kornmann | 345/653 |
| 2010/0079449 A1 | 4/2010 | McCarthy | |

FOREIGN PATENT DOCUMENTS

WO    WO2008094458    8/2008

* cited by examiner

*Primary Examiner* — Kee M Tung
*Assistant Examiner* — Haixia Du
(74) *Attorney, Agent, or Firm* — Fish & Richardson P.C.

(57) ABSTRACT

A three-dimensional ("3D") display environment for mobile device is disclosed that uses orientation data from one or more onboard sensors to automatically determine and display a perspective projection of the 3D display environment based on the orientation data without the user physically interacting with (e.g., touching) the display.

15 Claims, 4 Drawing Sheets

SENSOR BASED DISPLAY ENVIRONMENT

TECHNICAL FIELD

This disclosure relates generally to computer generated graphical user interfaces.

BACKGROUND

Modern computer operating systems often provide a desktop graphical user interface ("GUI") for displaying various graphical objects. Some examples of graphical objects include windows, taskbars, docks, menus and various icons for representing documents, folders and applications. A user can interact with the desktop using a mouse, trackball, track pad or other known pointing device. If the GUI is touch sensitive, then a stylus or one or more fingers can be used to interact with the desktop. A desktop GUI can be two-dimensional ("2D") or three-dimensional ("3D").

Modern mobile devices typically include a variety of onboard sensors for sensing the orientation of the mobile device with respect to a reference coordinate frame. For example, a graphics processor on the mobile device can display a GUI in landscape mode or portrait mode based on the orientation of the mobile device. Due to the limited size of the typical display of a mobile device, a 3D GUI can be difficult to navigate using conventional means, such as a finger or stylus. For example, to view different perspectives of the 3D GUI, two hands are often needed: one hand to hold the mobile device and the other hand to manipulate the GUI into a new 3D perspective.

SUMMARY

A 3D display environment for mobile device is disclosed that uses orientation data from one or more onboard sensors to automatically determine and display a perspective projection of the 3D display environment based on the orientation data without the user physically interacting with (e.g., touching) the display. In some implementations, the display environment can be changed based on gestures made a distance above a touch sensitive display that incorporates proximity sensor arrays.

In some implementations, a computer-implemented method is performed by one or more processors onboard a handheld mobile device. The method includes generating a 3D display environment; receiving first sensor data from one or more sensors onboard the mobile device, where the first sensor data is indicative of a first orientation of the mobile device relative to a reference coordinate frame; determining a first perspective projection of the 3D display environment based on the first sensor data; displaying the first perspective projection of the 3D display environment on a display of the mobile device; receiving second sensor data from the one or more sensors onboard the mobile device, where the second sensor data is indicative of a second orientation of the mobile device relative to the reference coordinate frame; determining a second perspective projection of the 3D display environment based on the second sensor data; and displaying the second perspective projection of the 3D display environment on the display of the mobile device.

Other implementations can include systems, devices, and computer-readable storage mediums.

The details of one or more implementations of a sensor based display environment are set forth in the accompanying drawings and the description below. Other features, aspects, and advantages of the sensor based display environment will become apparent from the description, the drawings, and the claims.

BRIEF DESCRIPTION OF THE DRAWINGS

Like reference symbols in the various drawings indicate like elements.

DETAILED DESCRIPTION

Sensor Based 3D Graphical User Interface

Figure 1A:
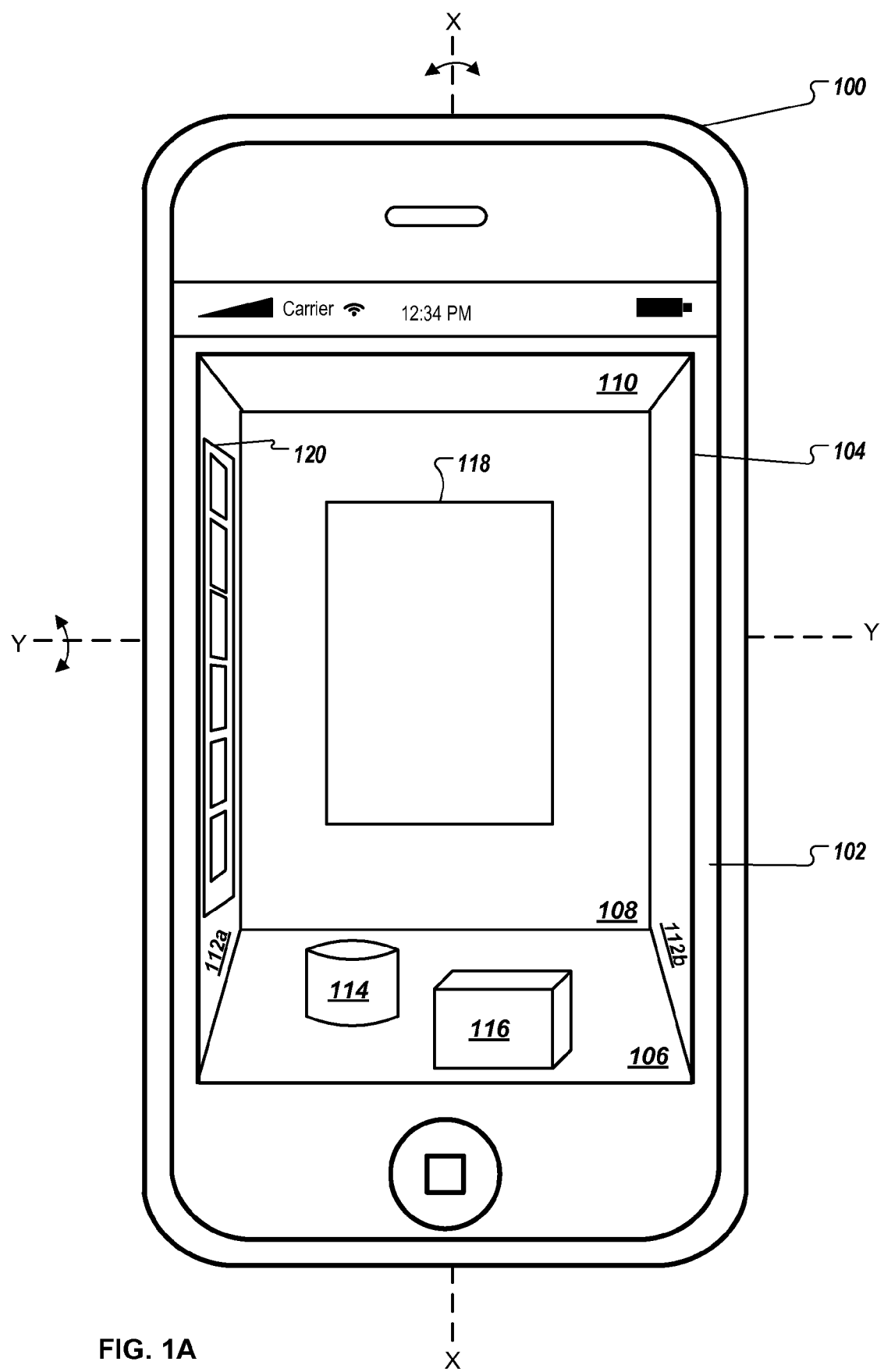
FIG. 1A illustrates a perspective projection in a 3D display environment of a mobile device using orientation data derived from onboard sensors.

FIG. 1A illustrates a perspective projection in a 3D display environment of a mobile device using orientation data derived from onboard sensors. Some examples of mobile devices include but are not limited to: a handheld computer, a personal digital assistant, a cellular telephone, a network appliance, a camera, a smart phone, an enhanced general packet radio service (EGPRS) mobile phone, a network base station, a media player, a navigation device, an email device, a game console, an electronic tablet, or a combination of any two or more of these data processing devices or other data processing devices.

In some implementations, mobile device 100 includes display 102 presenting display environment 104. For example, mobile device 100 can include a touch-sensitive surface that can receive touch input and gestures. Display environment 104 can be a 3D GUI (e.g., a desktop) having floor 106, back wall 108, ceiling 110 and sidewalls 112a and 112b. One or more two-dimensional ("2D") or 3D objects can be presented in display environment 104. In the example shown, 2D object 118 is pasted to back wall 108 and 3D objects 114 and 116 are resting on floor 106.

Display environment 104 can be a perspective projection of a 2D desktop or homepage for an operating system or application. The perspective projection can be conceptually understood to be the view from an imaginary camera viewfinder. The camera's position, orientation and field of view can control the behavior of a projection transformation or camera transform, which can be given by $$\begin{bmatrix} d_x \\ d_y \\ d_z \end{bmatrix} = \begin{bmatrix} 1 & 0 & 0 \\ 0 & \cos\theta_x & -\sin\theta_x \\ 0 & \sin\theta_x & \cos\theta_x \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} \cos\theta_z & -\sin\theta_x & 0 \\ \sin\theta_z & \cos\theta_z & 0 \\ 0 & 0 & 1 \end{bmatrix} \left( \begin{bmatrix} a_x \\ a_y \\ a_z \end{bmatrix} - \begin{bmatrix} c_x \\ c_y \\ c_z \end{bmatrix} \right), \quad [1]$$

where $a_{x,y,z}$ defines a point in 3D space that is to be projected, $c_{x,y,z}$ is the location of the camera, $\theta_{x,y,z}$ is the rotation of the camera, $e_{x,y,z}$ is the viewer's position relative to the display surface, and $d_{x,y,z}$ defines a point that is a translation of $a_{x,y,z}$ into a coordinate system defined by $c_{x,y,z}$. $D_{x,y,z}$ is determined by expression [1] by subtracting $c_{x,y,z}$ from $a_{x,y,z}$ and then applying the vector rotation matrix using $-\theta$. To the result. These calculations assume a left-handed coordinate system. The transformed point $d_{x,y,z}$ can then be projected to a point $b_{x,y}$ in the 2D plane using expression [2] (where x/y is used as the projection plane)

$$b_x=(d_x-e_x)(e_z/d_z),$$

$$b_y=(d_y-e_x)(e_x/d_z). \quad [2]$$

The distance of the viewer from the display surface, $d_{x,y,z}$, directly relates to the field of view, where $\alpha=2\cdot\tan(1/e_z)$ is the viewed angle, assuming that points $(-1, -1)$ and $(1,1)$ map to the corners of the display surface. Subsequent clipping and scaling may be used to map the 2D plane onto any particular display media.

By selecting values for the variables in expressions [1] and [2], a viewer can change the "camera view" to floor 106, back wall 108, ceiling 110 and sidewalls 112*a* and 112*b* of display environment 104. Objects 114, 116 can be similarly projected and mapped. In some implementations, the position of the camera $c_{x,y,z}$ and the location of the viewer $e_{x,y,z}$ relative to the display surface can be fixed. In such an implementation, only the rotation of the camera $\theta_{x,y,z}$ is variable.

In some implementations, $\theta_{x,y,z}$ is determined by an angular rate sensor onboard mobile device 100 (e.g., a gyroscope sensor). The "camera view" of display environment 104 changes when a viewer rotates mobile device 100 about a gyro sensor axis. If no gyro sensor is available another sensor can be used to determine $\theta_{x,y,z}$. For example, accelerometer sensor and/or magnetometer sensor data can be used to estimate $\theta_{x,y,z}$.

In some implementations, display environment 104 is determined based on the current orientation of mobile device 100 as indicated by one or more onboard sensors. For example, display environment 104 can be displayed when the viewer holds mobile device 100 with the display 102 directly facing the viewer. In this orientation, the camera view is directly facing back wall 108. As the user rotates mobile device 100 either clockwise or counterclockwise about the X axis of rotation (as viewed along the X axis of rotation), the camera view is moved towards either side wall 112*a* or sidewall 112*b*. More particularly, as the user rotates mobile device 100 clockwise about the X axis of rotation, the camera view moves toward sidewall 112*a*. Likewise, as the user rotates mobile device 100 counterclockwise about the X axis of rotation, the camera view moves toward sidewall 112*b*. As the user rotates mobile device 100 clockwise about the Y axis of rotation (as viewed along the Y axis of rotation), the camera view moves toward ceiling 110. As the user rotates mobile device 100 counterclockwise about the Y axis, the camera view moves toward floor 106.

By rotating mobile device 100 about the X and/or Y axes, the viewer can change their view of the display environment 104 as desired. Angular rotation about the X and Y axes can be measured or estimated from data provided by gyro sensors, accelerometers, magnetometers or any combination of sensor data that can provide an estimate of the orientation of mobile device 100 relative to a reference axis of rotation. The estimated orientation can then be used to determine the camera rotation $\theta_{x,y,z}$ in expression [1]. For example, sidewalls 112*a*, 112*b* may contain various objects of interest to the viewer (e.g., icons, windows), which the viewer can not easily see in the current display environment 104. By making small rotations of mobile device 110 about the X and Y axes of rotation, the viewer can change their view of display environment 104 and thus gain an improved (or different) perspective of objects displayed in display environment 104 (e.g., objects 114, 116). Objects in display environment 104 (e.g., objects 114, 116) can be translated a distance within the foreground and a distance within the background of display environment 104 proportional to the change in camera orientation $\theta_{x,y,z}$ (a function of the orientation of mobile device 100) and camera position $c_{x,y,z}$.

Figure 1B:
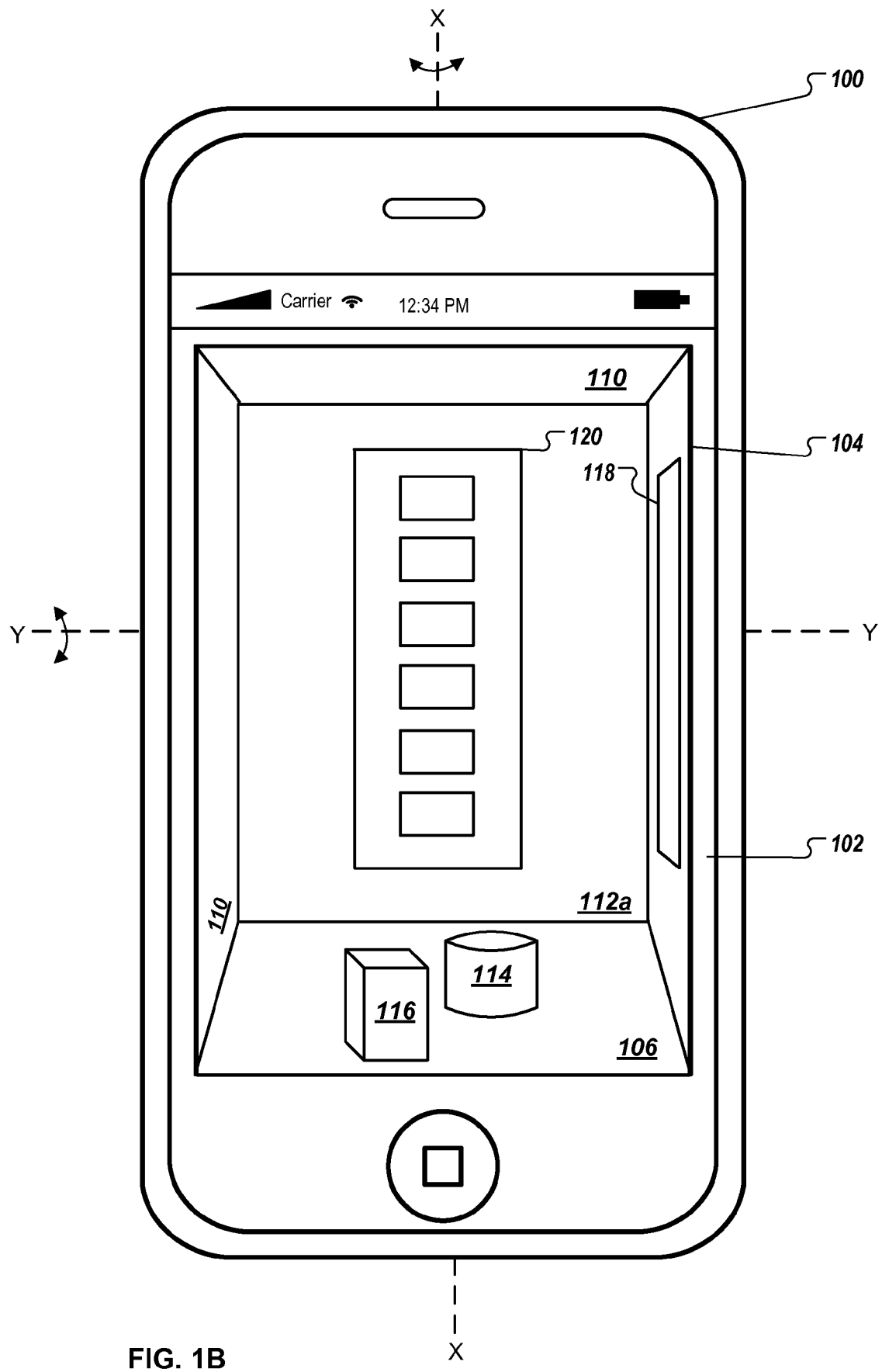
FIG. 1B illustrates a perspective projection in a 3D display environment using orientation data derived from onboard sensors, and including a "snap to" feature for changing camera position in the display environment.

FIG. 1B illustrates a perspective projection in a 3D display environment using orientation data derived from onboard sensors, and including a "snap to" feature for changing camera position in the display environment.

When using mobile device 100, there are physical constraints on the amount of any particular rotation. If the viewer rotates mobile device 100 about the X axis too far, the viewer will no longer see display environment 104. Likewise, if the viewer rotates mobile device 100 about the Y axis too far, the viewer will no longer see display environment 104. Likewise, if the viewer rotates mobile device 100 about the Y axis to far, the viewer will no longer see display environment 104. Accordingly, the camera rotation $\theta_{x,y,z}$ can be constrained and scaled so that a small change of rotation about the X or Y axes of rotation will change the camera view of display environment 104, but a larger rotation that exceeds a predetermined threshold value will cause a change in the position of the camera $c_{x,y,z}$ in display environment 104 in a "snap to" manner. FIG. 1B shows the resulting display environment 104 when the user rotates mobile device 100 clockwise about the X axis beyond a predetermined threshold value. When the rotation about the X axis of rotation exceeds a threshold value (e.g., >2 degrees), the camera position changes resulting in the viewer directly facing sidewall 112*a* in a "snap to" manner. In some implementations, the view can perform a "snap to" change in camera location by making a predetermined motion with mobile device 100, such as shaking the device.

Exemplary Process

Figure 2:
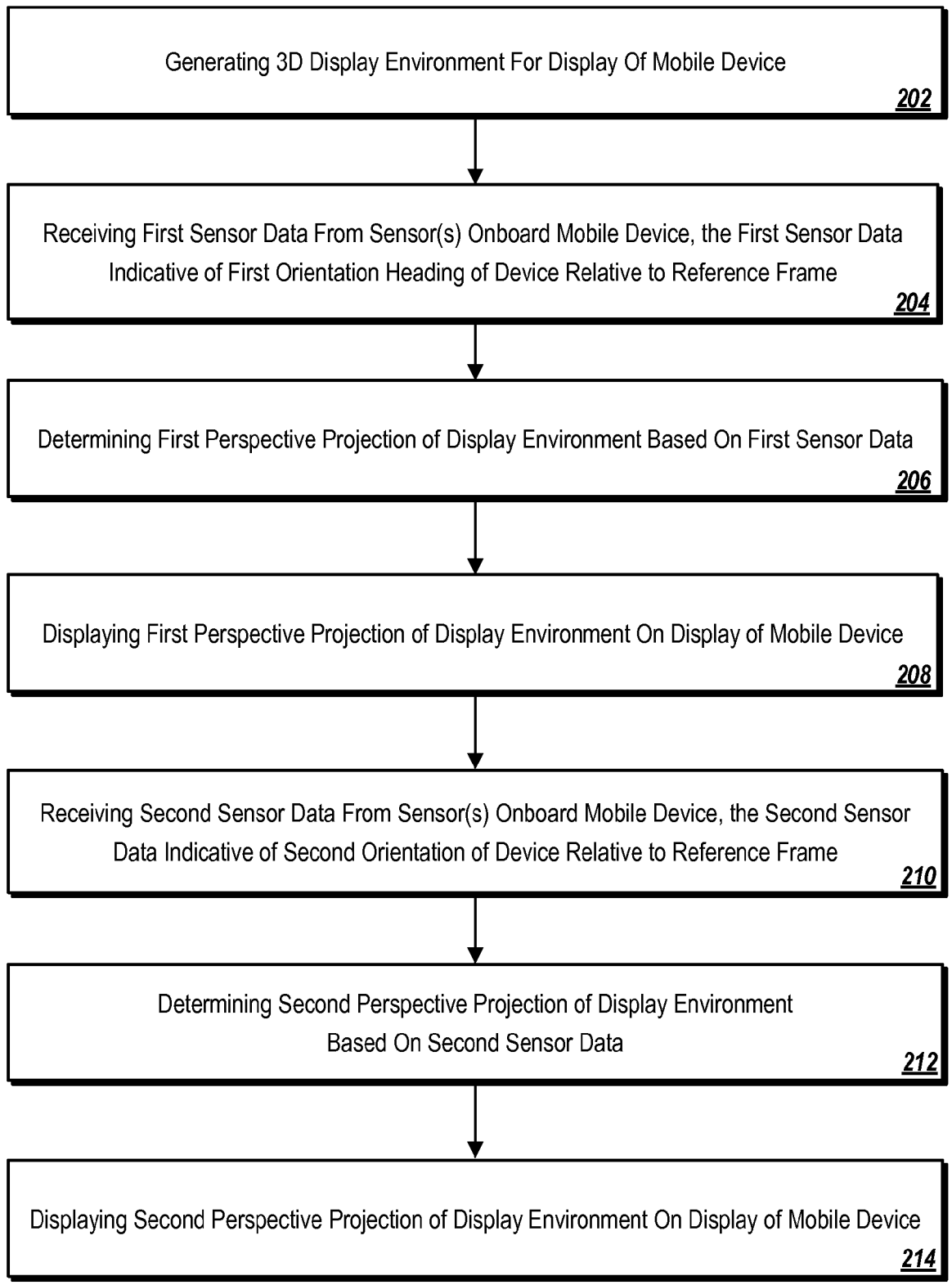
FIG. 2 is a flow diagram of an exemplary process for determining perspective projections in a 3D display environment using orientation data derived from onboard sensors.

FIG. 2 is a flow diagram of an exemplary process 200 for determining perspective projections in a 3D display environment using orientation data derived from onboard sensors. The process 200 will be described in reference to the examples of FIGS. 1A and 1B.

In some implementations, process 200 can begin by generating a 3D display environment for a display of a mobile device (202). The 3D display environment can be displayed using one or more graphics processing units (e.g., NVIDIA GeForce 330M) and a 3D graphics rendering engine, such as the open source object-oriented graphics rendering engine ("OGRE").

First sensor data is received from one or more onboard sensors of the mobile device (204). The first sensor data is indicative of orientation of the mobile device relative to a reference coordinate frame (e.g., a local level coordinate frame). A first perspective projection of the display environment is determined based on the first sensor data (206). For example, expressions [1] and [2] can be used with gyroscope sensor data to determine the first perspective projection of the display environment. The first perspective projection is displayed on the display of the mobile device (208).

Second sensor data is received from one or more onboard sensors of the mobile device (210). The second sensor data is indicative of second orientation of the mobile device relative to the reference coordinate frame. A second perspective projection of the display environment is determined based on the second sensor data (212). For example, expressions [1] and [2] can be used with second sensor data to determine the second perspective projection of the display environment. The second perspective projection is displayed on the display of the mobile device (214).

Exemplary Mobile Device Architecture

Figure 3:
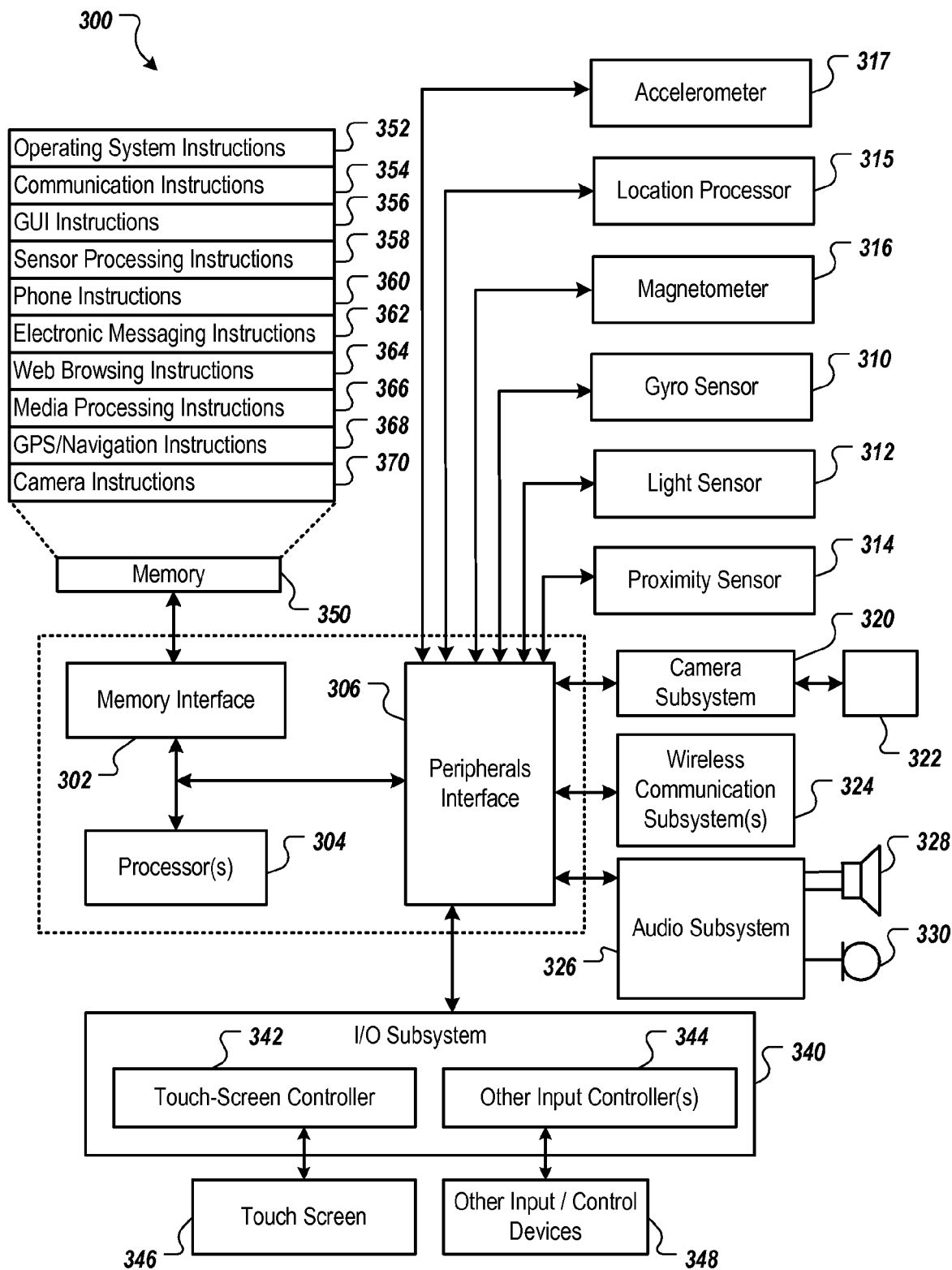
FIG. 3 is a block diagram of an exemplary hardware architecture for a device implementing the 3D display environment described in reference to FIGS. 1A, 1B and 2.

FIG. 3 is a block diagram of exemplary hardware architecture for a device implementing the 3D display environment described in reference to FIGS. 1A, 1B and 2. The device can include memory interface 302, one or more data processors, image processors and/or processors 304, and peripherals interface 306. Memory interface 302, one or more processors 304 and/or peripherals interface 306 can be separate components or can be integrated in one or more integrated circuits. The various components in the device, for example, can be coupled by one or more communication buses or signal lines.

Sensors, devices, and subsystems can be coupled to peripherals interface 306 to facilitate multiple functionalities. For example, gyroscope sensor 310, light sensor 312, and proximity sensor 314 can be coupled to peripherals interface 306 to facilitate orientation, lighting, and proximity functions of the mobile device. Gyroscope sensor 310 can provide orientation data to a 3D graphics processing engine to generate camera views of a display environment 104, as described in reference to FIGS. 1A, 1B and 2.

Location processor 315 (e.g., GPS receiver) can be connected to peripherals interface 306 to provide geopositioning. Electronic magnetometer 316 (e.g., an integrated circuit chip) can also be connected to peripherals interface 306 to provide data that can be used to determine the direction of magnetic North. Thus, electronic magnetometer 316 can be used as an electronic compass. Accelerometer 317 can also be connected to peripherals interface 306 to provide data that can be used to determine change of speed and direction of movement of the mobile device.

Camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which a mobile device is intended to operate. For example, a mobile device can include communication subsystems 324 designed to operate over a GSM network, a GPRS network, an EDGE network, a Wi-Fi or WiMax network, and a Bluetooth network. In particular, the wireless communication subsystems 324 can include hosting protocols such that the mobile device can be configured as a base station for other wireless devices.

Audio subsystem 326 can be coupled to a speaker 328 and a microphone 330 to facilitate voice-enabled functions, such as voice recognition, voice replication, digital recording, and telephony functions.

I/O subsystem 340 can include touch screen controller 342 and/or other input controller(s) 344. Touch-screen controller 342 can be coupled to a touch screen 346 or pad. Touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 346.

Other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of speaker 328 and/or microphone 330.

In one implementation, a pressing of the button for a first duration may disengage a lock of the touch screen 346; and a pressing of the button for a second duration that is longer than the first duration may turn power to the device on or off. The user may be able to customize a functionality of one or more of the buttons. The touch screen 346 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 302 can be coupled to memory 350. Memory 350 can include high-speed random access memory and/or non-volatile memory, such as one or more magnetic disk storage devices, one or more optical storage devices, and/or flash memory (e.g., NAND, NOR). Memory 350 can store operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can include a kernel (e.g., UNIX kernel).

Memory 350 may also store communication instructions 354 to facilitate communicating with one or more additional devices, one or more computers and/or one or more servers. Memory 350 may include graphical user interface ("GUI") instructions 356 to facilitate graphic user interface processing. For example, GUI instructions can implement a 3D graphics rendering engine for rendering a 3D display environment 104 on display 102 of mobile device 100, and for displaying perspective projections in the display environment according to FIGS. 1A, 1B and 2.

Sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; and camera instructions 370 to facilitate camera-related processes and functions. The memory 350 may also store other software instructions (not shown), such as security instructions, web video instructions to facilitate web video-related processes and functions, and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 350.

Each of the above identified instructions and applications can correspond to a set of instructions for performing one or more functions described above. These instructions need not be implemented as separate software programs, procedures, or modules. Memory 350 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A computer-implemented method performed by one or more processors onboard a handheld mobile device, comprising:
    generating a three-dimensional (3D) display environment having an imaginary camera located at a first position and a first camera view of the 3D display environment at the first camera position, the 3D display environment including two or more walls, the first camera view directly facing a first wall;
    receiving sensor data from the one or more sensors onboard the mobile device, the sensor data indicative of an orientation of the mobile device relative to a reference coordinate frame;
    determining that the orientation exceeds a threshold value;
    snapping the camera position from the first camera position to a second camera position;
    determining a second camera view at the second camera position of the 3D display environment, the second camera view directly facing a second wall; and
    displaying the 3D display environment from the second camera view.

2. The method of claim 1, wherein receiving sensor data further comprises:
    receiving gyro sensor data.

3. The method of claim 1, further comprising:
    translating objects in the 3D display environment between a foreground and a background of the 3D display environment.

4. The method of claim 1, where the first and second camera view or position is determined by a camera transform.

5. The method of claim 1, where determining that the orientation exceeds a threshold value includes determining that an angle of rotation about an axis in the reference coordinate frame exceeds a defined angle.

6. A non-transitory computer-readable storage medium having instructions stored thereon, which, when executed by one or more processors, causes the one or more processors to perform operations, comprising:
  generating a three-dimensional (3D) display environment having an imaginary camera located at a first position and a first camera view of the 3D display environment at the first camera position, the 3D display environment including two or more walls, the first camera view directly facing the first wall;
  receiving sensor data from the one or more sensors onboard the mobile device, the sensor data indicative of an orientation of the mobile device relative to a reference coordinate frame;
  determining that the orientation exceeds a threshold value;
  snapping the camera position from the first camera position to a second camera position;
  determining a second camera view at the second camera position of the 3D display environment, the second camera view directly facing a second wall; and
  displaying the 3D display environment from the second camera view.

7. The non-transitory computer-readable storage medium of claim 6, wherein receiving sensor data, further comprises:
  receiving gyro sensor data.

8. The non-transitory computer-readable storage medium of claim 6, further comprising:
  translating objects in the 3D display environment between a foreground and a background of the 3D display environment.

9. The non-transitory computer-readable storage medium of claim 6, where the first and second camera view or position is determined by a camera transform.

10. The non-transitory computer-readable storage medium of claim 6, where determining that the orientation exceeds a threshold value includes determining that an angle of rotation about an axis in the reference coordinate frame exceeds a defined angle.

11. A system, comprising:
  a processor;
  a computer-readable storage medium coupled to the processor and storing instructions, which, when executed by a processor, causes the processor to perform operations comprising:
  generating a three-dimensional (3D) display environment having an imaginary camera located at a first position and a first camera view of the 3D display environment at the first camera position, the 3D display environment including two or more walls, the first camera view directly facing a first wall;
  receiving sensor data from the one or more sensors onboard the mobile device, the sensor data indicative of an orientation of the mobile device relative to a reference coordinate frame;
  determining that the orientation exceeds a threshold value;
  snapping the camera position from the first camera position to a second camera position;
  determining a second camera view at the second camera position of the 3D display environment, the second camera view directly facing a second wall; and
  displaying the 3D display environment from the second camera view.

12. The system of claim 11, wherein receiving sensor data, further comprises:
  receiving gyro sensor data.

13. The system of claim 11, further comprising:
  translating objects in the 3D display environment between a foreground and a background of the 3D display environment.

14. The system of claim 11, where the first and second camera view or position is determined by a camera transform.

15. The system of claim 11, where determining that the orientation exceeds a threshold value includes determining that an angle of rotation about an axis in the reference coordinate frame exceeds a defined angle.

* * * * *